United States Patent
Fujishiro et al.

(10) Patent No.: US 12,245,225 B2
(45) Date of Patent: Mar. 4, 2025

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 386 days.

(21) Appl. No.: 17/711,389

(22) Filed: Apr. 1, 2022

(65) Prior Publication Data
US 2022/0232593 A1 Jul. 21, 2022

Related U.S. Application Data

(63) Continuation of application No. PCT/JP2020/036521, filed on Sep. 28, 2020.

(60) Provisional application No. 62/909,906, filed on Oct. 3, 2019.

(51) Int. Cl.
| | |
|---|---|
| H04W 72/21 | (2023.01) |
| H04W 72/1268 | (2023.01) |
| H04W 80/02 | (2009.01) |
| H04W 88/08 | (2009.01) |

(52) U.S. Cl.
CPC ....... *H04W 72/1268* (2013.01); *H04W 72/21* (2023.01); *H04W 80/02* (2013.01); *H04W 88/08* (2013.01)

(58) Field of Classification Search
CPC .......................... H04W 28/0278; H04W 40/22
See application file for complete search history.

(56) References Cited

U.S. PATENT DOCUMENTS

| | | | | |
|---|---|---|---|---|
| 11,564,124 | B2* | 1/2023 | Tesanovic | H04W 72/1263 |
| 2021/0051695 | A1* | 2/2021 | Majmundar | H04W 72/21 |
| 2023/0217304 | A1* | 7/2023 | Singh | H04W 72/1263 370/329 |

OTHER PUBLICATIONS

Samsung "Remaining issues with pre-emptive BSR"; 3GPP TSG-RAN WG2 #107-bis; R2-1912573; Oct. 14-18, 2019; pp. 1-6; Chongging, PRC.

(Continued)

*Primary Examiner* — Bo Hui A Zhu
(74) *Attorney, Agent, or Firm* — Studebaker Brackett PLLC

(57) ABSTRACT

A communication control method executed in a relay apparatus comprising a base station function processor, and a user equipment function processor, the communication control method including: receiving, by a MAC layer of the base station function processor, from the lower apparatus, a first buffer state report; notifying, by the MAC layer of the base station function processor, a MAC layer of the user equipment function processor, of an amount of first untransmitted upstream data; considering, by the MAC layer of the user equipment function processor, the amount of first untransmitted upstream data notified to be a part of an amount of upstream data queued in a MAC layer of the relay apparatus to calculate an amount of second untransmitted upstream data of the relay apparatus; and transmitting, by the MAC layer of the user equipment function processor, a second buffer state report.

7 Claims, 12 Drawing Sheets

(56) References Cited

OTHER PUBLICATIONS

Samsung (Rapporteur); "Report on email discussion (106#46)(IAB): Low-latency scheduling"; 3GPP TSG-RAN WG2 #107-bis; R2-1912572; Oct. 14-18, 2019; pp. 1-54; Chongging, PRC.

Kyocera "Consideration of preemptive BSR in IAB"; 3GPP TSG-RAN WG2 #107-Bis; R2-1913654; Oct. 14-18, 2019, pp. 1-7, Chongging, China.

* cited by examiner

COMMUNICATION CONTROL METHOD

RELATED APPLICATIONS

The present application is a continuation based on PCT Application No. PCT/JP2020/036521, filed on Sep. 28, 2020, which claims the benefit of U.S. Provisional Application No. 62/909,906 filed on Oct. 3, 2019. The content of which is incorporated by reference herein in their entirety.

TECHNICAL FIELD

The present disclosure relates to a communication control method used in a mobile communication system.

BACKGROUND ART

In the 3rd Generation Partnership Project (3GPP), which is a standardization project of a mobile communication system, a new relay apparatus referred to as an Integrated Access and Backhaul (IAB) node has been under study. One or a plurality of relay apparatuses are involved in communication between a base station and user equipment, and perform relay for the communication.

Such a relay apparatus includes a user equipment function processor and a base station function processor, and performs wireless communication with an upper apparatus (the base station or an upper relay apparatus) by using the user equipment function processor and performs wireless communication with a lower apparatus (the user equipment or a lower relay apparatus) by using the base station function processor.

SUMMARY

A communication control method according to a first aspect is a method executed in a relay apparatus including a base station function processor for connecting wirelessly to a lower apparatus, and a user equipment function processor connecting wirelessly to an upper apparatus, the relay apparatus relaying upstream data from the lower apparatus to the upper apparatus. The communication control method includes transmitting, by a MAC layer of the user equipment function processor, a pre-emptive buffer state report indicating an amount of first untransmitted upstream data of the lower apparatus, to the upper apparatus. The pre-emptive buffer state report is transmitted together with a MAC subheader including a logical channel ID defined for the pre-emptive buffer state report. A format of the pre-emptive buffer state report is identical to a format of a buffer state report indicating untransmitted upstream data of the relay apparatus.

A communication control method according to a second aspect is a method executed in a relay apparatus including a base station function processor for connecting wirelessly to a lower apparatus, and a user equipment function processor for connecting wirelessly to an upper apparatus, the relay apparatus relaying upstream data from the lower apparatus to the upper apparatus. The communication control method includes transmitting, by a MAC layer of the user equipment function processor, a pre-emptive buffer state report indicating an amount of first untransmitted upstream data of the lower apparatus, to the upper apparatus. Transmitting the pre-emptive buffer state report includes transmitting, by the MAC layer of the user equipment function processor, a buffer state report indicating untransmitted upstream data of the relay apparatus, to the upper apparatus together with the pre-emptive buffer state report.

A communication control method according to a third aspect is a method executed in a relay apparatus including a base station function processor for connecting wirelessly to a lower apparatus, and a user equipment function processor for connecting wirelessly to an upper apparatus, the relay apparatus relaying upstream data from the lower apparatus to the upper apparatus. The communication control method includes transmitting, by a MAC layer of the user equipment function processor, a pre-emptive buffer state report indicating an amount of first untransmitted upstream data in the lower apparatus, to the upper apparatus. The pre-emptive buffer state report includes the amount of the first untransmitted upstream data indicated by the first buffer state information, out of first buffer state information indicating the amount of the first untransmitted upstream data and second buffer state information indicating an amount of untransmitted upstream data in a lower apparatus than the lower apparatus.

A relay apparatus according to a fourth aspect is a relay apparatus including a base station function processor configured to connect wirelessly to a lower apparatus, and a user equipment function processor configured to connect wirelessly to an upper apparatus, the relay apparatus being configured to relay upstream data from the lower apparatus to the upper apparatus. A MAC layer of the user equipment function processor is configured to transmit a pre-emptive buffer state report indicating an amount of first untransmitted upstream data of the lower apparatus, to the upper apparatus. The pre-emptive buffer state report includes a logical channel ID defined for the pre-emptive buffer state report. A format of the pre-emptive buffer state report is identical to a format of a buffer state report indicating second untransmitted upstream data in the relay apparatus.

A relay apparatus according to a fifth aspect is a relay apparatus including a base station function processor configured to connect wirelessly to a lower apparatus, and a user equipment function processor configured to connect wirelessly to an upper apparatus, the relay apparatus being configured to relay upstream data from the lower apparatus to the upper apparatus. A MAC layer of the user equipment function processor is configured to transmit a pre-emptive buffer state report indicating an amount of first untransmitted upstream data of the lower apparatus, to the upper apparatus. In a case of transmitting the pre-emptive buffer state report, the MAC layer of the user equipment function processor transmits a buffer state report indicating untransmitted upstream data of the relay apparatus, to the upper apparatus together with the pre-emptive buffer state report.

A relay apparatus according to a sixth aspect is a relay apparatus including a base station function processor configured to connect wirelessly to a lower apparatus, and a user equipment function processor configured to connect wirelessly to an upper apparatus, the relay apparatus being configured to relay upstream data from the lower apparatus to the upper apparatus. A MAC layer of the user equipment function processor is configured to transmit, to the upper apparatus, a pre-emptive buffer state report indicating an amount of first untransmitted upstream data of the lower apparatus. The pre-emptive buffer state report includes the amount of the first untransmitted upstream data indicated by the first buffer state information, out of first buffer state information indicating the amount of the first untransmitted upstream data and second buffer state information indicating an amount of untransmitted upstream data in a lower apparatus than the lower apparatus.

A user equipment according to a seventh aspect includes a transmitter configured to transmit, to a relay apparatus, a first buffer state report indicating an amount of first untransmitted upstream data of the user equipment. The relay apparatus is a relay apparatus configured to relay upstream data from the user equipment to an upper apparatus. The transmitter is configured to determine a notification, provided from an application layer of the user equipment, of an amount of untransmitted upstream data in the application layer to be a trigger, and transmit the first buffer state report indicating, as the first untransmitted upstream data, the untransmitted upstream data of the application layer.

A communication control method according to an eighth aspect is a method executed in a relay apparatus including a base station function processor for connecting wirelessly to a lower apparatus, and a user equipment function processor for connecting wirelessly to an upper apparatus, the relay apparatus relaying upstream data from the lower apparatus to the upper apparatus. The communication control method includes: notifying, by a MAC layer of the base station function processor, a MAC layer of the user equipment function processor, of an amount of upstream data queued in the MAC layer of the base station function processor; considering, by the MAC layer of the user equipment function processor, the amount of upstream data notified to be a part of an amount of upstream data queued in a MAC layer of the relay apparatus to calculate an amount of untransmitted upstream data of the relay apparatus; and transmitting, by the MAC layer of the user equipment function processor, a buffer state report indicating the amount of untransmitted upstream data calculated, to the upper apparatus.

A communication control method according to a ninth aspect is a method executed in a relay apparatus including a base station function processor for connecting wirelessly to a lower apparatus, and a user equipment function processor for connecting wirelessly to an upper apparatus, the relay apparatus relaying upstream data from the lower apparatus to the upper apparatus. The communication control method includes: notifying, by an RLC layer of the base station function processor, an RLC layer of the user equipment function processor, of an amount of upstream data queued in the MAC layer of the base station function processor; considering, by the MAC layer of the user equipment function processor, the amount of upstream data notified to be a part of an amount of upstream data queued in an RLC layer of the relay apparatus to calculate an amount of untransmitted upstream data of the relay apparatus; and transmitting, by the MAC layer of the user equipment function processor, a buffer state report indicating the amount of untransmitted upstream data calculated, to the upper apparatus.

A communication control method according to a tenth aspect is a method executed in a relay apparatus including a base station function processor for connecting wirelessly to a lower apparatus, and a user equipment function processor for connecting wirelessly to an upper apparatus, the relay apparatus relaying upstream data from the lower apparatus to the upper apparatus. The communication control method includes: notifying, by a BAP layer of the relay apparatus, an MAC layer of the user equipment function processor, of an amount of upstream data queued in the BAP layer; considering, by the MAC layer of the user equipment function processor, the amount of upstream data notified to be a part of an amount of upstream data queued in the relay apparatus to calculate an amount of untransmitted upstream data of the relay apparatus; and transmitting, by the MAC layer of the user equipment function processor, a buffer state report indicating the amount of untransmitted upstream data calculated, to the upper apparatus.

DESCRIPTION OF EMBODIMENTS

A mobile communication system according to an embodiment will be described with reference to the drawings. In the description of the drawings, the same or similar parts are denoted by the same or similar reference signs.

Configuration of Mobile Communication System

Figure 1:
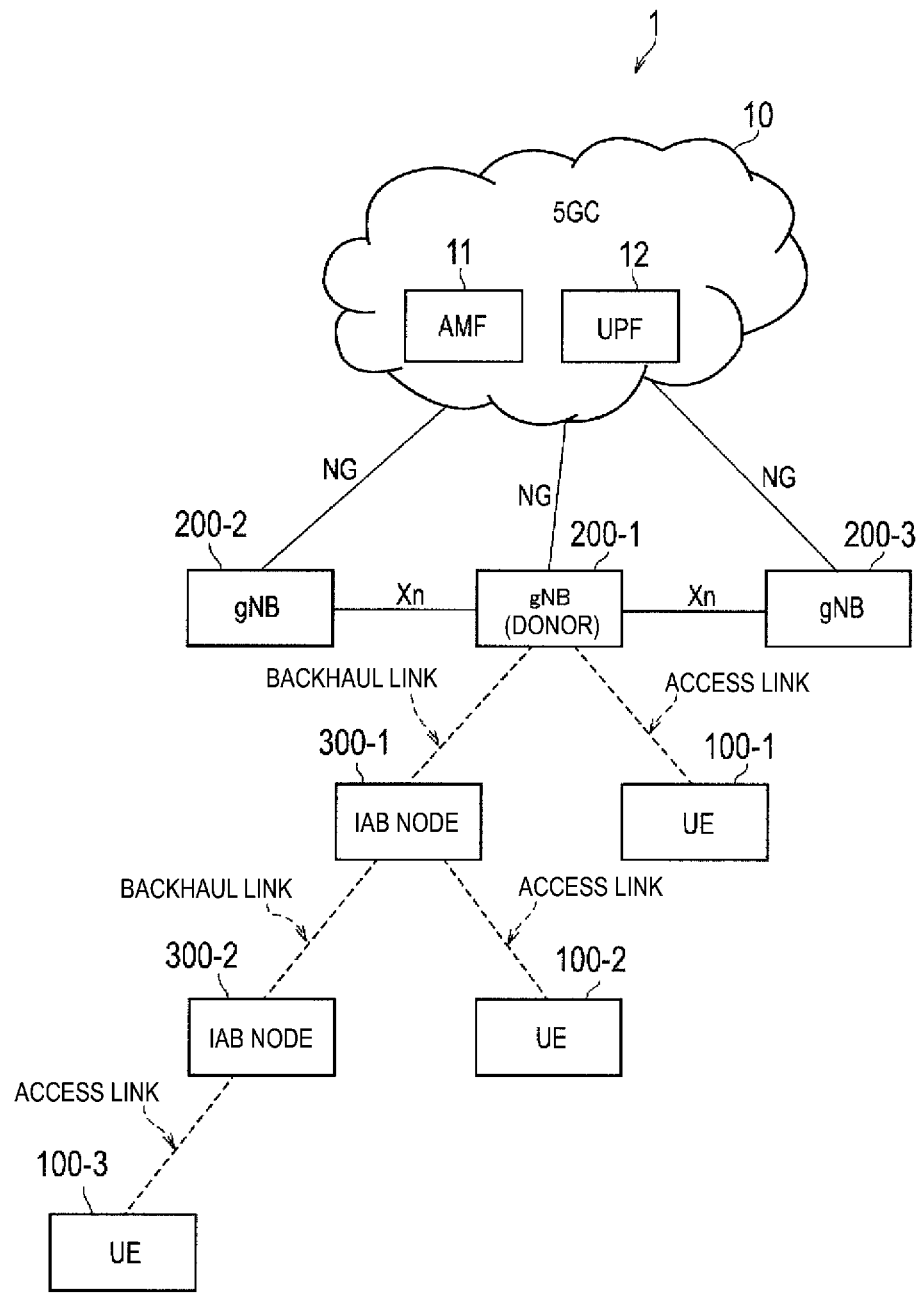
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system 1 according to an embodiment. The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, user equipment (UE) 100, a base station (referred to as a gNB) 200, and an IAB node 300. The IAB node 300 is an example of a relay apparatus.

The present embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

The gNB 200 is connected to the 5GC 10 via an interface referred to as an NG interface. FIG. 1 illustrates an example of three gNB 200-1 to gNB 200-3 that are connected to the 5GC 10. The gNB 200 is a fixed wireless communication apparatus that performs wireless communication with the UE 100. In a case where the gNB 200 includes a donor function, the gNB 200 performs wireless communication with the IAB node connecting wirelessly to the gNB 200.

The gNB 200 is connected to another neighboring gNB 200 via an inter-base station interface referred to as an Xn interface. FIG. 1 illustrates an example in which the gNB 200-1 is connected to the gNB 200-2 and the gNB 200-2.

The gNB 200-1 may include a central unit (CU) and a distributed unit (DU).

Each gNB 200 manages one or a plurality of cells. The cell is used as a term denoting a minimum unit of a wireless communication area. The cell may be used as a term denoting a function or a resource for performing wireless communication with the UE 100. One cell belongs to one carrier frequency.

The UE 100 is a mobile wireless communication apparatus that can perform wireless communication with the gNB 200. The UE 100 may perform wireless communication with the IAB node 300. The UE 100 may be any type of apparatus as long as the UE 100 performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle.

FIG. 1 illustrates an example in which UE 100-1 is wirelessly connected to the gNB 200-1, UE 100-2 is wirelessly connected to an IAB node 300-1, and UE 100-3 is wirelessly connected to an IAB node 300-2. The UE 100-1 directly performs communication with the gNB 200-1. The UE 100-2 indirectly performs communication with the gNB 200-1 via the IAB node 300-1. The UE 100-3 indirectly performs communication with the gNB 200-1 via the IAB node 300-1 and the IAB node 300-2.

The IAB node 300 is an apparatus (relay apparatus) that is involved in communication between the eNB 200 and the UE 100, and performs relay for the communication. FIG. 1 illustrates an example in which the IAB node 300-1 is connected wirelessly to the gNB 200-1, used as a donor, and the IAB node 300-2 is connected wirelessly to the IAB node 300-1. Each IAB node 300 manages a cell. A cell ID of the cell managed by the IAB node 300 may be the same as or different from a cell ID of the cell of the donor gNB 200-1.

The IAB node 300 includes a UE function processor (user equipment function processor) and a gNB function processor (base station function processor). Such a UE function processor may be referred to as an MT, and the gNB function processor may be referred to as a DU.

The IAB node 300 performs wireless communication with an upper apparatus (the gNB 200 or an upper IAB node 300) by using the UE function processor (MT) of the IAB node 300 itself, and performs wireless communication with a lower apparatus (the UE 100 or a lower IAB node 300) by using the gNB function processor (DU) of the IAB node 300 itself. Note that the UE function processor (MT) refers to at least a part of the functions of the UE 100, and the IAB node 300 need not necessarily include all of the functions of the UE 100. The gNB function processor (DU) refers to at least a part of the functions of the gNB 200, and the IAB node 300 need not necessarily include all of the functions of the gNB 200. For example, the gNB function processor (DU) need not include an RRC (Radio Resource Control) layer, a PDCP layer, or the like.

A wireless section between the UE 100 and the IAB node 300 or the gNB 200 may be referred to as an access link (or Uu). A wireless section between the IAB node 300 and the gNB 200 or another IAB node 300 may be referred to as a backhaul link (or Un). The backhaul link may be referred to as a fronthaul link.

Data communication in the access link and data communication in the backhaul link can be integrated and multiplexed in Layer 2, radio resources can be dynamically allocated to the data communication in the backhaul link, and paths of relay can be dynamically switched. Note that, for the access link and the backhaul link, millimeter wave bands may be used. The access link and the backhaul link may be multiplexed by means of time division multiplexing and/or frequency division multiplexing.

Configuration of Base Station

Figure 2:
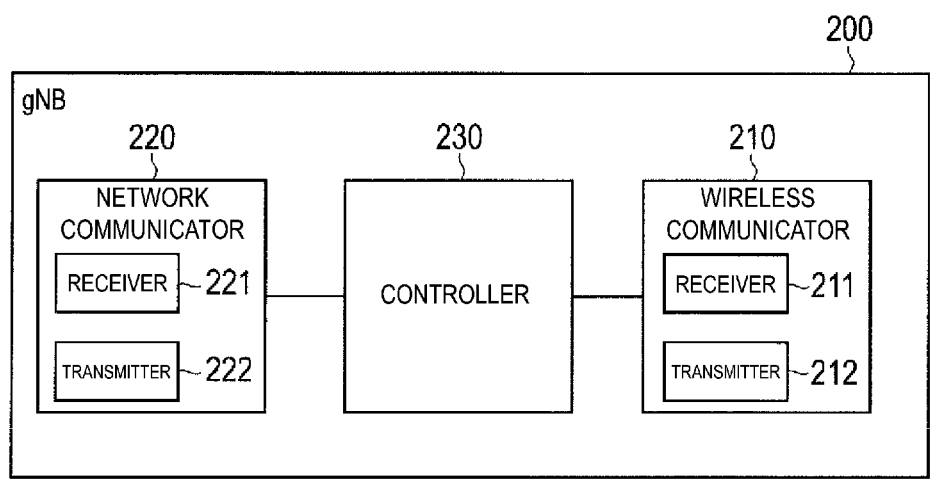
FIG. 2 is a diagram illustrating a configuration of a base station according to an embodiment.

Now, a configuration of the gNB 200, used as a base station according to the present embodiment will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 is used for wireless communication with the UE 100 and wireless communication with the IAB node 300. The wireless communicator 210 includes a receiver 211 and a transmitter 212. The receiver 211 performs various types of reception while being controlled by the controller 230. The receiver 211 includes an antenna, and converts a radio signal received by the antenna into a baseband signal (received signal) and outputs the baseband signal to the controller 230. The transmitter 212 performs various types of transmission while being controlled by the controller 230. The transmitter 212 includes an antenna, and converts a baseband signal (transmission signal) to be output by the controller 230 into a radio signal and transmits the radio signal from the antenna.

The network communicator 220 is used for wired communication (or wireless communication) with the 5GC 10 and wired communication (or wireless communication) with another neighboring gNB 200. The network communicator 220 includes a receiver 221 and a transmitter 222. The receiver 221 performs various types of reception while being controlled by the controller 230. The receiver 221 receives a signal from the outside and outputs the received signal to the controller 230. The transmitter 222 performs various types of transmission while being controlled by the controller 230. The transmitter 222 transmits a transmission signal output by the controller 230 to the outside.

The controller 230 performs various kinds of controls for the gNB 200. The controller 230 includes at least one memory and at least one processor electrically connected to the memory. The memory stores programs to be executed by the processor and information to be used for processes by the processor. The processor may include a baseband processor and a CPU. The baseband processor performs, for example, modulation, demodulation, and coding and decoding of the baseband signal. The CPU executes the programs stored in the memory to perform various kinds of processes. The processor executes processing described below.

Configuration of Relay Apparatus

Figure 3:
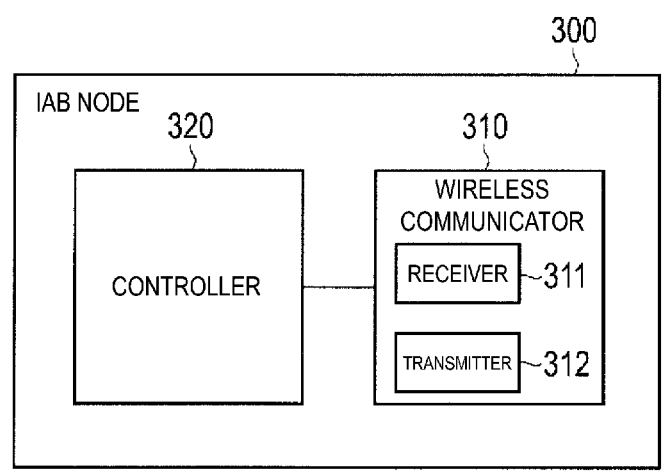
FIG. 3 is a diagram illustrating a configuration of a relay apparatus according to an embodiment.

Now, a configuration of the IAB node 300, used as a relay apparatus according to an embodiment will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 is used for wireless communication (backhaul link) with the gNB 200 and wireless communication (access link) with the UE 100. The wireless communicator 310 for backhaul link communication and the wireless communicator 310 for access link communication may be provided separately.

The wireless communicator 310 includes a receiver 311 and a transmitter 312. The receiver 311 performs various types of reception while being controlled by the controller 320. The receiver 311 includes an antenna, and converts a radio signal received by the antenna into a baseband signal (received signal) and outputs the baseband signal to the controller 320. The transmitter 312 performs various types of transmission while being controlled by the controller 320. The transmitter 312 includes an antenna, and converts a baseband signal (transmission signal) to be output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs, for example, modulation, demodulation, and coding and decoding of the baseband signal. The CPU executes the programs stored in the memory to perform various kinds of processes. The processor executes processing described below.

Configuration of User Equipment

Figure 4:
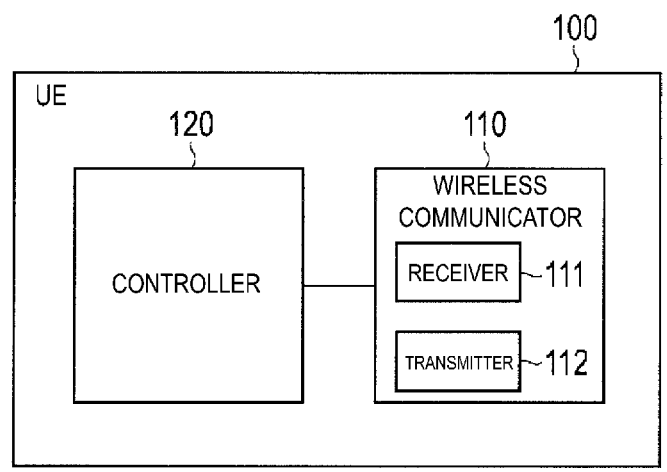
FIG. 4 is a diagram illustrating a configuration of user equipment according to an embodiment.

Now, a configuration of the UE 100, used as a user equipment according to an embodiment will be described. FIG. 4 is a diagram illustrating a configuration of the UE 100. As illustrated in FIG. 4, the UE 100 includes a wireless communicator 110 and a controller 120.

The wireless communicator 110 is used for wireless communication in the access link, specifically, wireless communication with the gNB 200 and wireless communication with the IAB node 300. The wireless communicator 110 includes a receiver 111 and a transmitter 112. The receiver 111 performs various types of reception while being controlled by the controller 120. The receiver 111 includes an antenna, and converts a radio signal received by the antenna into a baseband signal (received signal) and outputs the baseband signal to the controller 120. The transmitter 112 performs various types of transmission while being controlled by the controller 120. The transmitter 112 includes an antenna, and converts a baseband signal (transmission signal) to be output by the controller 120 into a radio signal and transmits the radio signal from the antenna.

The controller 120 performs various types of control in the UE 100. The controller 120 includes at least one memory and at least one processor electrically connected to the memory. The memory stores programs to be executed by the processor and information to be used for processes by the processor. The processor may include a baseband processor and a CPU. The baseband processor performs, for example, modulation, demodulation, and coding and decoding of the baseband signal. The CPU executes the programs stored in the memory to perform various kinds of processes. The processor executes processing described below.

Example of Protocol Stack Configuration

Now, an example of a protocol stack configuration in the mobile communication system 1 according to an embodiment will be described.

Figure 5:
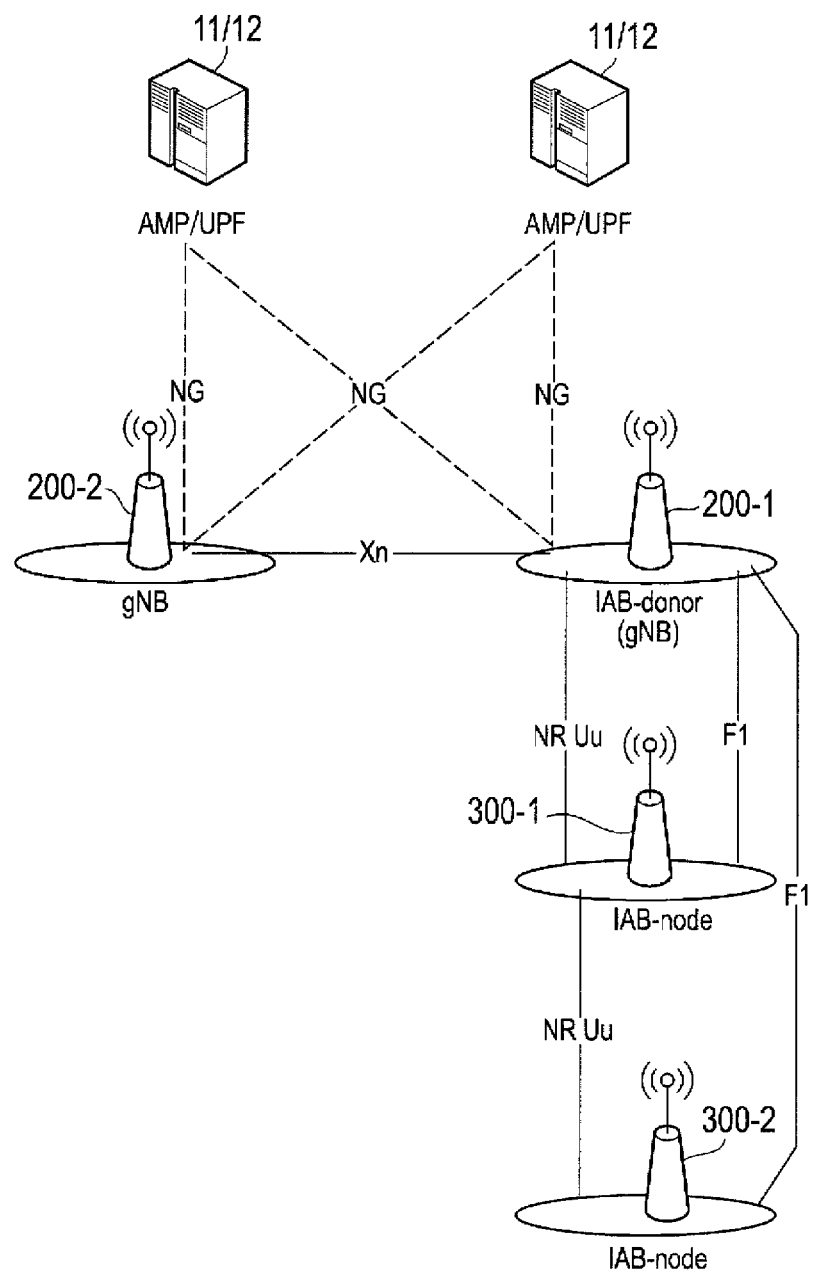
FIG. 5 is a diagram illustrating a network configuration of a mobile communication system according to an embodiment.

FIG. 5 is a diagram illustrating a network configuration of the mobile communication system 1 according to an embodiment. As illustrated in FIG. 5, the mobile communication system 1 enables wireless relaying of NR access by using NR for the backhaul. The donor gNB 200-1 is a network side NR backhaul termination node and is a gNB 200 with an additional function to support the IAB. The backhaul enables multi-hop via a plurality of hops. The gNB 200 may be separated into a gNB-CU function and a gNB-DU function.

Each IAB node 300 includes a gNB-DU function (base station function processor). The gNB-DU function is hereinafter simply referred to as "DU". Specifically, the DU terminates an NR Uu wireless interface to the UE 100 and a lower IAB node. The DU supports an F1 protocol for a gNB-CU (hereinafter simply referred to as "CU") on the donor gNB 200-1. A neighboring node (i.e., a lower apparatus) on an NR access interface of a DU may be referred to as a "slave node."

Each IAB node 300 supports an NR Uu wireless interface with an MT function (UE function processor). Hereinafter, the MT function is simply referred to as the "MT". The MT connects to the higher IAB node or the DU of the donor gNB 200-1 and connects to the CU of the donor gNB 200-1 by using RRC. The MT establishes, with the donor gNB 200-1, a signaling radio bearer (SRB) carrying an RRC message and an NAS message. A neighboring node (i.e., an upper apparatus) on the NR Uu wireless interface of the MT may be referred to as a "master node".

All IAB nodes 300 connected to the donor gNB 200-1 via one or a plurality of hops form a Directed Acyclic Graph (DAG) topology rooted by the donor gNB 200-1. The DAG topology is sometimes referred to as an IAB topology. In the DAG topology, "upstream" refers to the direction to the master node, and "downstream" refers to the direction to the slave node.

In FIG. 5, an example is illustrated in which the IAB node 300-1 connects wirelessly to the donor gNB 200-1, the IAB node 300-2 wirelessly connects to the IAB node 300-1, and the F1 protocol is transmitted with two backhaul hops. The F1 protocol refers to a communication protocol between the CU and the DU. The F1 protocol includes an F1-C protocol corresponding to a protocol for a control plane, and an F1-U protocol corresponding to a protocol for a user plane.

Figure 6:
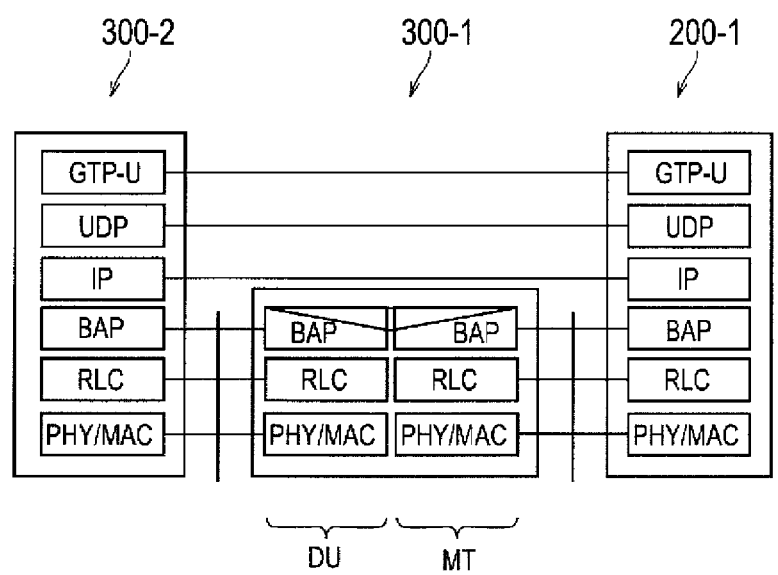
FIG. 6 is a diagram illustrating an example of a protocol stack for an F1-U protocol according to an embodiment.

FIG. 6 is a diagram illustrating an example of a protocol stack for the F1-U protocol.

As illustrated in FIG. 6, the donor gNB 200-1 includes layers, specifically, GPRS Tunneling Protocol for User Plane (GTP-U), User Datagram Protocol (UDP), an Internet Protocol (IP), Backhaul Adaptation Protocol (BAP), Radio Link Control (RLC), Medium Access Control (MAC), and a Physical layer (PHY).

The downstream IAB node 300-2 communicates with the donor gNB 200-1 via the IAB node 300-1, used as an intermediate node. The IAB node 300-2, like the donor gNB 200-1, includes layers of GTP-U, UDP, IP, BAP, RLC, MAC, and PHY.

The IAB node 300-1, used as the intermediate node, includes the functions of the MT and DU. The MT includes layers of BAP, RLC, MAC, and PHY. Similarly, the DU includes layers of BAP, RLC, MAC, and PHY. FIG. 6 illustrates an example in which the BAP layer of the DU and the BAP layer of the MT are separately provided, but the BAP layer of the DU and the BAP layer of the MT may be integrated.

A protocol related to the wireless interface will now be described. The PHY layer performs coding and decoding, modulation and demodulation, mapping and demapping of antennas, and mapping and demapping of resources. Data and control information are transmitted between the PHY layers via a physical channel.

The MAC layer performs priority control of data, retransmission processing through a hybrid ARQ (HARQ), and the like. Data and control information are transmitted between the MAC layers via a transport channel. The MAC layer of the donor gNB 200 and the MAC layer of the DU each includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layers via a logical channel.

The BAP layer performs routing processing and bearer mapping and demapping processing in the user plane.

Figure 7:
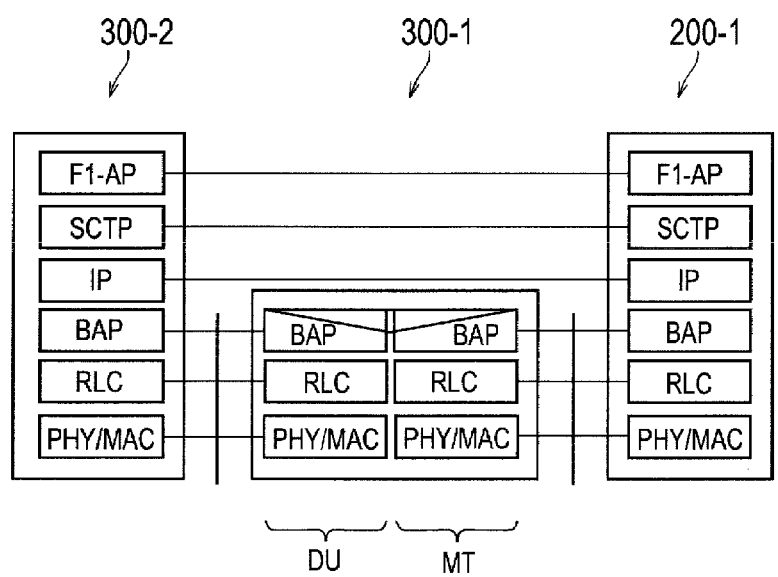
FIG. 7 is a diagram illustrating an example of a protocol stack for an F1-C protocol according to an embodiment.

FIG. 7 is a diagram illustrating an example of a protocol stack for the F1-C protocol. Here, differences from the F1-U protocol will be described.

As illustrated in FIG. 7, the donor gNB 200-1 includes layers of F1 Application Protocol (F1-AP) and Stream Control Transmission Protocol (SCTP) instead of the layers of GTP-U and UDP illustrated in FIG. 6. Similarly, the downstream IAB node 300-2 includes layers of F1-AP and SCTP instead of the layers of GTP-U and UDP illustrated in FIG. 6.

Pre-Emptive BSR

Figure 8:
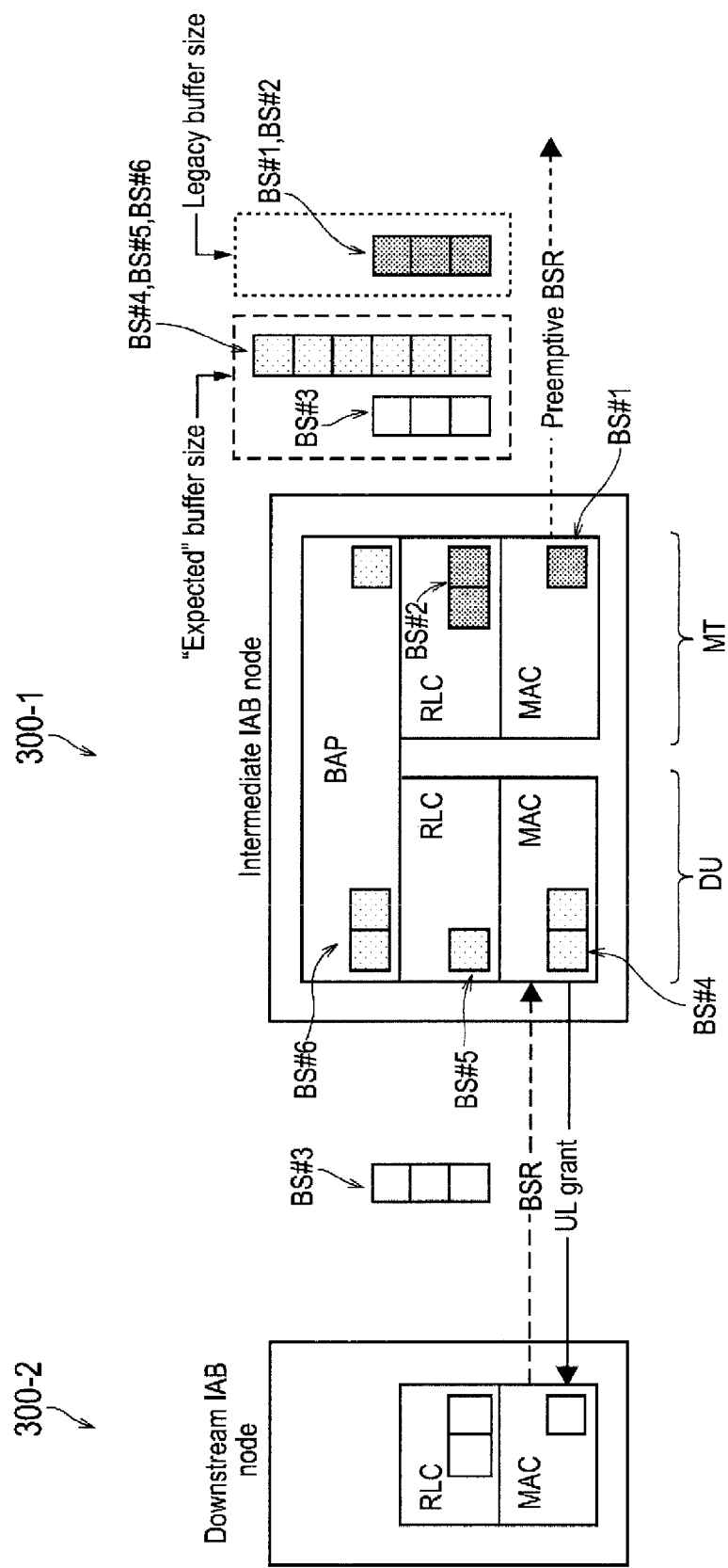
FIG. 8 is a diagram illustrating operations related to a pre-emptive BSR according to an embodiment.

Now, a pre-emptive BSR according to an embodiment will be described. FIG. 8 is a diagram illustrating operations related to a pre-emptive BSR in accordance with an embodiment.

As illustrated in FIG. 8, the IAB node 300-1 is an intermediate IAB node, and the IAB node 300-2 is a downstream IAB node.

An example will be described below in which the lower apparatus of the IAB node 300-1 is the downstream IAB node, but the lower apparatus of the IAB node 300-1 may be the UE 100. The upper apparatus of the IAB node 300-1 is mostly assumed to be the donor gNB 200-1, but the upper apparatus of the IAB node 300-1 may be an upstream IAB node. In other words, in FIG. 13, at least one IAB node may be interposed between the IAB node 300-1 and the donor gNB 200-1.

The IAB node 300-1 includes a DU connecting wirelessly to the IAB node 300-2 and an MT connecting wirelessly to the upper apparatus and relays upstream data from the IAB node 300-2 to the upper apparatus. In an embodiment, the MAC layer of the MT transmits, to the upper apparatus, a pre-emptive BSR indicating the amount of untransmitted upstream data.

In general, the BSR transmitted by UE 100 (hereinafter referred to as "legacy BSR") indicates the amount of untransmitted data (i.e., uplink buffer amount) in each of the layers of MAC, RLC, and PDCP for each logical channel group (LCG). Each LCG includes at least one logical channel, and the LCGs are groups configured for each priority. The legacy BSR format includes a short BSR and a long BSR. The short BSR includes a field in which an ID of the LCG is stored and a buffer size field in which information indicating the amount of untransmitted data is stored. The long BSR includes a field in which a bit sequence indicating the presence or absence of the buffer size field for each LCG is stored, and a plurality of the buffer size fields. The gNB 200 determines, for each LCG, the amount of untransmitted data in the UE 100 based on the BSR from the UE 100, and performs scheduling such that uplink radio resources corresponding to the amount of untransmitted data are allocated to the UE 100.

On the other hand, the IAB node 300-1 includes not only the MT (UE function processor), but also the DU (base station function processor), and the IAB node 300-2 may be present that is connected to the DU. Thus, when only the amount of untransmitted data (Legacy buffer size) for the MT of the IAB node 300-1 is reported to the upper apparatus, the upper apparatus is prevented from perform scheduling taking into account the amount of potential untransmitted data (Expected buffer size). Thus, there is a problem in that a shortage or delay occurs in allocation of uplink radio resources to the IAB node 300-2.

Thus, the pre-emptive BSR will reflect at least one of the amount of data queued in the DU of the IAB node 300-1 and the amount of untransmitted data in the IAB node 300-2 that connects to the DU. Accordingly, the upper apparatus can perform scheduling taking into account the potential amount of untransmitted data, thus allowing suppression of a possible shortage or delay in allocation of the uplink radio resources. For example, in a case that no radio resources have been allocated to the backhaul link (i.e., MT) of the IAB node 300-1, a scheduling request can be transmitted to the upper node by triggering the pre-emptive BSR. The transmission of the scheduling request allows the appropriate radio resource allocation to be prepared before the actual upstream data reaches the protocol for transmission (i.e., RLC, MAC) of the MT.

The amount of untransmitted upstream data indicated by the pre-emptive BSR includes variations A) to C) described below.

A) The pre-emptive BSR indicates each of the amount of untransmitted upstream data in the IAB node 300 itself and the amount of untransmitted upstream data in the lower apparatus connecting to the IAB node 300.

Figure 9:
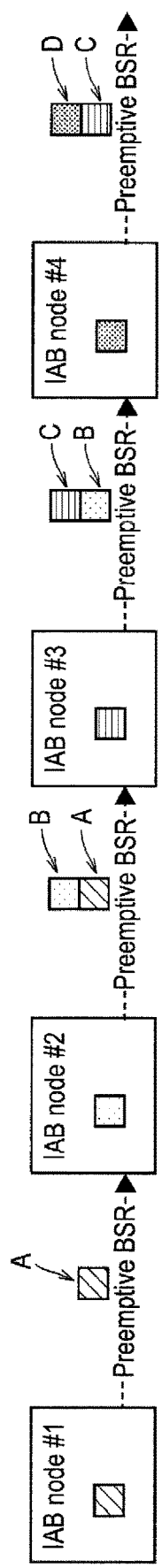
FIG. 9 is a diagram illustrating Configuration Example 1 of the pre-emptive BSR according to an embodiment.

FIG. 9 is a diagram illustrating Configuration Example 1 of the pre-emptive BSR according to an embodiment. As illustrated in FIG. 9, an IAB node #1 transmits a pre-emptive BSR indicating the amount of untransmitted upstream data A in the IAB node itself, to an IAB node #2.

The IAB node #2 transmits a pre-emptive BSR indicating the amount of untransmitted upstream data B in the IAB node itself and the amount of untransmitted upstream data A in the IAB node #1, to an IAB node #3.

The IAB node #3 transmits a pre-emptive BSR indicating the amount of untransmitted upstream data C in the IAB node itself and the amount of untransmitted upstream data B in the IAB node #2, to an IAB node #4.

The IAB node #4 transmits a pre-emptive BSR indicating the amount of untransmitted upstream data D in the IAB node itself and the amount of untransmitted upstream data C in the IAB node #3, to the IAB node #4.

B) The pre-emptive BSR indicates each of the amount of untransmitted upstream data in the IAB node 300 itself, the amount of untransmitted upstream data in the lower apparatus connecting to the IAB node 300, and the amount of untransmitted data in a further lower apparatus of the lower apparatus.

Figure 10:
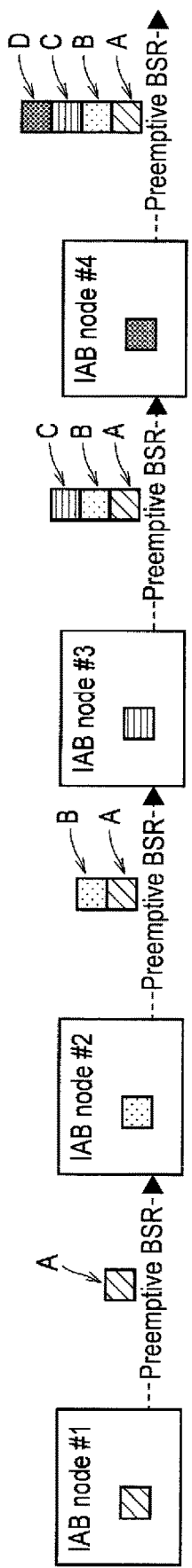
FIG. 10 is a diagram illustrating Configuration Example 2 of the pre-emptive BSR according to an embodiment.

FIG. 10 is a diagram illustrating Configuration Example 2 of the pre-emptive BSR according to an embodiment. As illustrated in FIG. 10, an IAB node #1 transmits a pre-emptive BSR indicating the amount of untransmitted upstream data A in the IAB node itself, to an IAB node #2.

The IAB node #2 transmits a pre-emptive BSR indicating the amount of untransmitted upstream data B in the IAB node itself and the amount of untransmitted upstream data A in the IAB node #1, to an IAB node #3.

The IAB node #3 transmits a pre-emptive BSR indicating the amount of untransmitted upstream data C in the IAB node itself, the amount of untransmitted upstream data B in the IAB node #2, and the amount of untransmitted upstream data A in the IAB node #1, to an IAB node #4.

The IAB node #4 transmits a pre-emptive BSR indicating the amount of untransmitted upstream data D in the IAB node itself, the amount of untransmitted upstream data C in the IAB node #3, the amount of untransmitted upstream data B in the IAB node #2, and the amount of untransmitted upstream data A in the IAB node #1, to an IAB node #4.

In the configuration of the pre-emptive BSR as described above, the pre-emptive BSR may be a new MAC CE that differs from the legacy BSR in format. The format of the pre-emptive BSR may be a format with individual buffer size fields in which the amount of untransmitted upstream data in each node is stored.

C) The pre-emptive BSR indicates the amount of untransmitted upstream data in the lower apparatus connecting to the IAB node 300 itself without indicating the amount of untransmitted upstream data in the IAB node 300 itself.

For example, in a case that the pre-emptive BSR and the legacy BSR are used in combination, the legacy BSR can indicate the amount of untransmitted upstream data in the IAB node 300 itself to the upper apparatus, and the pre-emptive BSR can indicate the amount of untransmitted upstream data in the lower apparatus. Thus, the pre-emptive BSR may exclusively be used for reporting the amount of untransmitted upstream data in the lower apparatus. Similar to B) described above, the pre-emptive BSR may be used to indicate the amount of untransmitted data in a further lower apparatus of the lower apparatus.

In an embodiment, the format of the pre-emptive BSR may be a new MAC control element (MAC CE) that differs from the legacy BSR in format. The pre-emptive BSR may be in a format with individual buffer size fields for the respective nodes.

Alternatively, as the format of the pre-emptive BSR, the format of the legacy BSR may be used. The use of the LCG for node identification allows the legacy BSR to indicate the amount of untransmitted upstream data for each node.

The configuration of the pre-emptive BSR as in A) described above is mainly assumed below, but the configuration of the pre-emptive BSR as in B) or C) described above may be used.

As illustrated in FIG. 8, the pre-emptive BSR indicates the amounts BS #1 and #2 of data described below, as is the case with the amounts of data indicated by legacy BSR (Legacy Buffer size).

The amount BS #1 of upstream data queued in the MAC layer of the MT.
The amount BS #2 of upstream data queued in the RLC layer of the MT.

Furthermore, the pre-emptive BSR indicates at least one of the amounts BS #3 to #6 of data described below.

The amount BS #3 of data indicated by the BSR from the IAB node 300-2. Alternatively, the amount BS #3' of uplink radio resources (i.e., the size of uplink grant) allocated to the IAB node 300-2 by the IAB node 300-1 in accordance with the BSR. An example will be described below in which the amount BS #3 of data indicated by the BSR is used, but an uplink grant size BS #3' may be used instead of the amount BS #3 of data indicated by the BSR.

The amount BS #4 of upstream data queued in the MAC layer of the DU.
The amount BS #5 of upstream data queued in the RLC layer of the DU.
The amount BS #6 of upstream data queued in the BAP layer.

Data Amount Calculation Operation

Now, a data amount calculation operation for reflecting the amounts BS #3 to #6 of data in the pre-emptive BSR will be described by using FIG. 8.

(1) The amount BS #3 of data indicated by the BSR from the IAB node 300-2:

First, in the IAB node 300-1, the MAC layer of the DU receives, from the IAB node 300-2, a BSR (first BSR) indicating the amount BS #3 of untransmitted upstream data in the IAB node 300-2.

Second, the MAC layer of the DU notifies the MAC layer of the MT, of the amount BS #3 of data (amount of MAC data). In notifying the MAC layer of the MT, of the amount BS #3 of data indicated by the BSR from the IAB node 300-2, the MAC layer of the DU may provide the notification indirectly via the BAP layer or directly without using the BAP layer.

Third, the MAC layer of the MT considers the amount BS #3 of data notified, as a part of the amount of upstream data queued in the transmission MAC layer of the IAB node 300-1 to calculate the amount of untransmitted upstream data in the IAB node 300-1.

Fourth, the MAC layer of the MT transmits, to the upper apparatus, a pre-emptive BSR (second BSR) indicating the calculated amount of the untransmitted upstream data.

This allows the upper apparatus to perform scheduling taking into account the amount BS #3 of untransmitted upstream data in the IAB node 300-2.

The MAC layer of the DU may switch between the amount BS #3 of data to the MAC layer of the MT is to be notified and not to be notified, i.e., the notification to the MAC layer of the MT is to be enabled and disabled on a per logical channel basis or on a per LCG basis or by batch.

For example, the MAC layer of the DU may switch between the notification to the MAC layer of the MT is to be enabled or disabled, on a per logical channel basis or on a per LCG basis or by batch in accordance with a configuration provided for the IAB node 300-1 by the donor gNB 200-1 (for example, the configuration provided through the RRC message or the F1 message). Specifically, the logical channel or LCG intended for the notification to the MAC layer of the MT may be specified by the donor gNB 200-1.

Now, Operation Examples 1 to 3 of data amount calculation based on the amount BS #3 of data indicated by the BSR from the IAB node 300-2 will be described.

Example Operation 1

The BSR received from the IAB node 300-2 by the IAB node 300-1 (first BSR) may have a configuration in A) described above. The BSR includes first buffer state information (first buffer size field) indicating the amount of untransmitted upstream data in the IAB node 300-2, and second buffer state information (second buffer size field) indicating the amount of untransmitted upstream data in a further lower apparatus of the IAB node 300-2.

In such a case, the MAC layer of the MT treats the amount of first untransmitted upstream data indicated by the first buffer state information out of the first buffer state information and the second buffer state information as a part of the amount of the upstream data queued in the MAC layer of the IAB node 300-1. In other words, the MAC layer of the MT generates a pre-emptive BSR that does not indicate the amount of untransmitted upstream data in the further lower apparatus of the IAB node 300-2 without considering the amount of untransmitted upstream data in the further lower apparatus of the IAB node 300-2 as a part of the amount of upstream data queued in the MAC layer of the IAB node 300-1.

The MAC layer of the DU may notify the MAC layer of the MT, of the first buffer state information out of the first buffer state information and the second buffer state information without notifying the MAC layer of the MT, of the second buffer state information. This allows the MAC layer of the MT to generate a pre-emptive BSR that does not indicate the amount of untransmitted upstream data in the further lower apparatus of the IAB node 300-2.

Operation Example 2

The IAB node 300-1 may receive, from the IAB node 300-2, both pre-emptive BSR (third BSR) and legacy BSR (first BSR) in C) described above. Such a pre-emptive BSR indicates the amount of untransmitted upstream data in the further lower apparatus of the IAB node 300-2. On the other hand, the legacy BSR indicates the amount of the untransmitted upstream data in the IAB node 300-2.

In such a case, the MAC layer of the MT treats the amount of the untransmitted upstream data indicated by the legacy BSR out of the pre-emptive BSR and the legacy BSR as a part of the amount of upstream data queued in the MAC layer of the IAB node 300-1. In other words, the MAC layer of the MT generates a pre-emptive BSR that does not indicate the amount of untransmitted upstream data in the further lower apparatus of the IAB node 300-2 without considering the amount of untransmitted upstream data in the further lower apparatus of the IAB node 300-2 as a part of the amount of upstream data queued in the MAC layer of the IAB node 300-1.

The MAC layer in the DU may notify the MAC layer of the MT, of the amount of data indicated by the legacy BSR without notifying the MAC layer of the MT, of the amount of data indicated by the pre-emptive BSR out of the pre-emptive BSR and the legacy BSR. This allows the MAC layer of the MT to generate a pre-emptive BSR that does not indicate the amount of untransmitted upstream data in the further lower apparatus of the IAB node 300-2.

Operation Example 3

The IAB node 300-1 may receive, from the IAB node 300-2, a pre-emptive BSR using the format of legacy BSR. In this case, each of the backhaul links (each node) is associated with the LCG, and the node can be identified by the LCG. For example, the legacy BSR includes the first buffer state information indicating the amount of the untransmitted upstream data associated with a first LCG and the second buffer state information indicating the amount of the untransmitted upstream data associated with a second LCG.

Here, the first LCG is associated with a link (first backhaul link) between the IAB node 300-1 and the IAB node 300-2. On the other hand, the second LCG is associated with a link (second backhaul link) between the IAB node 300-2 and the further lower apparatus of the IAB node 300-2.

In such a case, the MAC layer of the MT treats the amount of untransmitted upstream data indicated by the first buffer state information out of the first buffer state information and the second buffer state information as a part of the amount of the upstream data queued in the MAC layer of the IAB node 300-1. In other words, the MAC layer of the MT generates a pre-emptive BSR that does not indicate the amount of untransmitted upstream data in the further lower apparatus of the IAB node 300-2 without considering the amount of untransmitted upstream data in the further lower apparatus of the IAB node 300-2 as a part of the amount of upstream data queued in the MAC layer of the IAB node 300-1.

The MAC layer of the DU may notify the MAC layer of the MT, of the first buffer state information out of the first buffer state information and the second buffer state information without notifying the MAC layer of the MT, of the second buffer state information. This allows the MAC layer of the MT to generate a pre-emptive BSR that does not indicate the amount of untransmitted upstream data in the further lower apparatus of the IAB node 300-2.

(2) The amount BS #4 of upstream data queued in MAC layer of the DU:

First, the MAC layer of the DU notifies the MAC layer of the MT, of the amount BS #4 (amount of MAC data) of upstream data queued in the MAC layer of the DU. In this regard, the amount of upstream data queued in the MAC layer of the DU may be only the amount of data successfully received (specifically decoded) by the MAC layer of the DU. For example, the amount of upstream data queued in the MAC layer of the DU may correspond to packets via which the MAC layer of the DU has transmitted an HARQ ACK to the IAB node 300-2, or exclude the amount of data queued in an HARQ buffer in the MAC layer of the DU. The MAC layer of the DU may notify the amount of upstream data BS #4 queued in the MAC layer of the DU, to the MAC layer of the MT indirectly via the BAP layer or directly without using the BAP layer.

Second, the MAC layer of the MT considers the amount BS #4 of upstream data notified as a part of the amount of upstream data queued in the MAC layer of the IAB node 300-1, and calculates the amount of untransmitted upstream data in the IAB node 300-1.

Third, the MAC layer of the MT transmits, to the upper apparatus, a pre-emptive BSR indicating the calculated amount of the untransmitted upstream data.

Accordingly, the upper apparatus can perform scheduling taking into account the amount BS #4 of upstream data queued in the MAC layer of the DU.

The MAC layer of the DU may switch between the amount BS #4 of data to the MAC layer of the MT is to be notified and not to be notified, i.e., the notification to the MAC layer of the MT is to be enabled and disabled on a per logical channel basis or on a per LCG basis or by batch. For example, the MAC layer of the DU may switch between the notification to the MAC layer of the MT is to be enabled or disabled, on a per logical channel basis or on a per LCG basis or by batch in accordance with a configuration provided for the IAB node 300-1 by the donor gNB 200-1 (for example, the configuration provided through the RRC message or the F1 message). Specifically, the logical channel or LCG intended for the notification to the MAC layer of the MT may be specified by the donor gNB 200-1. Alternatively, whether to provide the notification to the MAC layer of the MT may be capable of being configured by batch.

For example, in MAC configuration information (MAC main config.) transmitted by RRC from the donor gNB 200-1 to the IAB node 300-1, information (such as a flag) may be allowed to be configured that indicates whether to treat the data as the amount of MAC data for each LCG.

(3) The amount BS #5 of upstream data queued in RLC layer of the DU:

First, the RLC layer of the DU notifies the MAC layer of the MT of the amount BS #5 (amount of RLC data) of upstream data queued in the RLC layer of the DU. In this regard, the amount of upstream data queued in the RLC layer of the DU may be only the amount of data successfully received by the RLC layer of the DU. For example, the amount of upstream data queued in the RLC layer of the DU may correspond to packets via which the RLC layer of the DU has transmitted an ARQ ACK to the IAB node 300-2 (i.e., the packets other than packets corresponding to the ARQ ACK waiting to be transmitted) or exclude the amount of data queued in an ARQ buffer in the RLC layer of the DU (i.e., the amount of data queued in a sliding window). The RLC layer of the DU may notify the amount BS #5 of upstream data queued in the RLC layer of the DU, to the MAC layer of the MT indirectly via the BAP layer or directly without using the BAP layer.

Second, the MAC layer of the MT considers the amount of upstream data notified as a part of the amount of upstream data queued in the RLC layer of the IAB node 300-1 to calculate the amount of untransmitted upstream data in the IAB node 300-1.

Third, the MAC layer of the MT transmits, to the upper apparatus, a pre-emptive BSR indicating the calculated amount of the untransmitted upstream data.

This allows the upper apparatus to perform scheduling taking into account the amount BS #5 of upstream data queued in the RLC layer of the DU.

The RLC layer of the DU may switch between the notification of the amount BS #5 of data to the MAC layer of the MT is enabled and disabled, on a per logical channel basis or by batch. The RLC layer of the DU may switch between the notification is enabled and disabled, on a per logical channel basis or by batch in accordance with a configuration (for example, the configuration provided through the RRC message or the F1 message) provided for the IAB node 300-1 by the donor gNB 200-1.

For example, in logical channel configuration information (logical channel config.) transmitted by RRC from the donor gNB 200-1 to the IAB node 300-1, information (such as a flag) may be configured that indicates whether to treat the data as the amount of RLC data for each logical channel ID.

(4) The amount BS #6 of upstream data queued in the BAP layer:

First, the BAP layer of the IAB node 300-1 notifies the MAC layer of the MT of the amount BS #6 of upstream data queued in the BAP layer (amount of BAP data).

As described above, in a case that data amount notifications have been received from the MAC layer and RLC layer of the DU, the BAP layer may also notify these amounts of data to the MAC layer of the MT. In this regard, the BAP layer may notify the MAC layer of the MT, of separate amounts of data in the MAC, RLC, and BAP. The BAP layer may notify the MAC layer of the MT, of separate amounts of data for the respective logical channel IDs. The BAP layer may notify the MAC layer for each LCG (logical channel group), and the LCG may comply with the LCG configuration (of the MAC layer) of the MT. The BAP layer may notify the MAC layer of the MT, of one piece of information obtained by adding the amount of MAC data and the amount of RLC data to the amount of BAP data.

Second, the MAC layer of the MT considers the amount BS #6 of upstream data notified as a part of the amount of upstream data queued in the IAB node 300-1, and calculates the amount of untransmitted upstream data in the IAB node 300-1.

Third, the MAC layer of the MT transmits, to the upper apparatus, a pre-emptive BSR indicating the calculated amount of the untransmitted upstream data.

The BAP layer of the DU may switch between the notification of the amount BS #6 of data to the MAC layer of the MT is to be enabled and disabled, on a per logical channel basis or by batch. For example, the BAP layer may switch between the notification is to be enabled or disabled, on a per logical channel basis or by batch in accordance with a configuration (for example, the configuration provided through the RRC message or the F1 message) provided for the IAB node 300-1 by the donor gNB 200-1.

For example, in a routing configuration provided for the BAP layer, information (such as a flag) may be allowed to be configured that indicates whether to treat the data as the amount of BAP data for each logical channel ID.

In this regard, the logical channel IDs for configuration on whether the data is treated as the amount of BAP data may be logical channel IDs on the DU side (reception side logical channel IDs) or logical channel IDs on the MT side (transmission side logical channel IDs). Specifically, for bearer mapping, i.e., mapping between the logical channel IDs on the DU side and the logical channel IDs on the MT side, the BAP layer can use one of the sets of logical channel IDs for configuration.

Alternatively, the target for which whether to treat the data as the amount of BAP data is configured may be IDs for the source IAB node (i.e., the lower apparatus) or IDs for the destination IAB node (i.e., the upper apparatus). In this regard, the source and destination may be the nearest IAB nodes or a source and a destination located several hops away.

Example of Operation Flow

Figure 11:
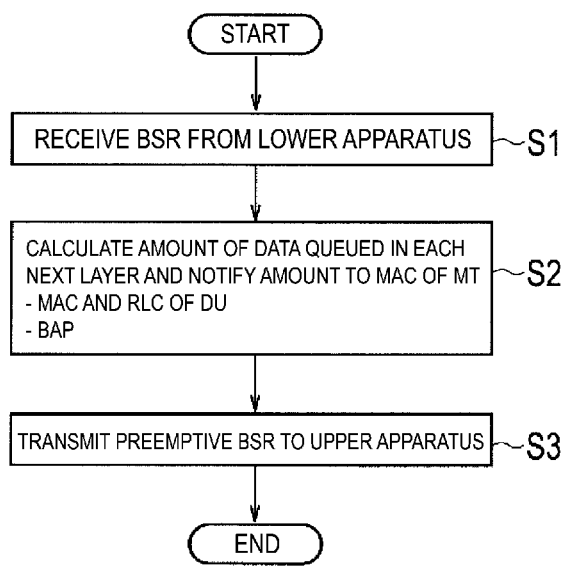
FIG. 11 is a diagram illustrates an example of an operation flow of a relay apparatus according to an embodiment.

Now, an example of an operation flow of the IAB node 300-1 according to an embodiment will be described. FIG. 11 is a diagram illustrating an example of an operation flow of the IAB node 300-1 according to an embodiment.

As illustrated in FIG. 11, in step S1, the MAC layer of the DU of the IAB node 300-1 receives a BSR from the IAB node 300-2, corresponding to the lower apparatus.

In step S2, the MAC layer of the DU of the IAB node 300-1 identifies the amount of data indicated by the BSR received from the IAB node 300-2, and notifies, of the amount of data identified, the MAC layer of the MT of the IAB node 300-1.

The MAC layer of the DU of the IAB node 300-1 calculates the amount of upstream data queued in the IAB node 300-1, and notifies, of the calculated data amount, the MAC layer of the MT of the IAB node 300-1.

The RLC layer of the DU of the IAB node 300-1 calculates the amount of the upstream data queued in the IAB node 300-1, and notifies, of the amount of data calculated, the MAC layer of the MT of the IAB node 300-1.

The BAP layer of the IAB node 300-1 calculates the amount of upstream data queued in the IAB node 300-1 and notifies the MAC layer of the MT of the IAB node 300-1, of the calculated data amount.

In step S3, the MAC layer of the MT of the IAB node 300-1 totals the amounts of data notified from the MAC, the RLC, and the BAP layers of the DU of the IAB node 300-1 and transmits, to the upper apparatus, a pre-emptive BSR indicating the amount of data totaled. As illustrated in FIG. 9 and FIG. 10, the MAC layer of the MT of the IAB node 300-1 may transmit, to the upper apparatus, a pre-emptive BSR including a buffer size field indicating the amount of untransmitted upstream data in the IAB node 300-2 (i.e., the amount of data indicated by the BSR received from the IAB node 300-2), and a buffer size field indicating the amount of untransmitted upstream data in the IAB node 300-1 (i.e., the total value of the amount of data queued in the MAC, the RLC, and the BAP layers of the DU of the IAB node 300-1).

Other Embodiments

In the embodiments described above, as a method for distinguishing between the legacy BSR and the pre-emptive BSR, the legacy BSR and the pre-emptive BSR can be distinguished from each other based on a difference in BSR format. However, the IAB node 300-1 may include, in the pre-emptive BSR, an identifier for identifying the pre-emptive BSR. As described above, the pre-emptive BSR is a BSR that reflects the amount of untransmitted upstream data other than the amount of the untransmitted upstream data in the MT. For example, the IAB node 300-1 may provide the identification of the pre-emptive BSR to the upper apparatus by including, in a header portion (MAC subheader) transmitted together with the BSR MAC CE, a logical channel ID defined for the pre-emptive BSR.

In the embodiments described above, aside from the donor gNB 200, a base station managing each IAB node 300 (hereinafter referred to as a master base station) may be present. The master base station may be an LTE base station. The MT of each IAB node 300 may include two connections (i.e., double connection) including a connection to the master base station and a connection to the upper apparatus (upper IAB node or donor gNB). The master base station may be a master node, and the connection to the master base station may be a Master Cell Group (MCG) link. The upper apparatus (upper IAB node or donor gNB) may be a secondary node, and the connection to the upper apparatus may be a Secondary Cell Group (SCG) link.

In the embodiments described above, an example has been mainly described, in which the mobile communication system 1 is a 5G mobile communication system. However, the base station in the mobile communication system 1 may be an eNB being an LTE base station. The core network in the mobile communication system 1 may be an Evolved Packet Core (EPC). Furthermore, the gNB may be connected to the EPC, the eNB can also be connected to the 5GC, and the gNB and the eNB may be connected via an inter-base station interface (Xn interface, X2 interface).

In the embodiments described above, an example has been mainly described in which, in the IAB topology, the IAB node (MT) transmits the pre-emptive BSR. However, the pre-emptive BSR may be transmitted by the UE 100, and the UE 100 need not belong to the IAB topology. Specifically, the UE 100 may notify a pre-emptive BSR reflecting the amounts of data other than the amounts of data queued in the MAC, RLC, PDCP, and SDAP of the UE 100. In this case, the pre-emptive BSR may be triggered, for example, by the data amount notification from the application layer. Thus, for example, in Time Sensitive Communication (TSC: communication with strict time constraints), when a packet (for example, a packet having a high priority or requiring high QoS) is generated (or is expected to be generated) in the higher layer, the reception side for the pre-emptive BSR is enabled to schedule radio resource allocation, allowing the UE 100 to perform transmission with low delay.

Note that a program that causes a computer to execute each of the processing operations according to the embodiments described above may be provided. In addition, the program may be recorded in a computer-readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory storing a program for executing each of the processing operations performed by the UE 100, the gNB 200, or the IAB node 300 and a processor executing the program stored in the memory.
Supplementary Note
Introduction The WID of Integrated Access and Backhaul (IAB), which includes support for low latency scheduling in multi-hop networks, was approved. Based on the results of the corresponding mail discussion, the RAN11 #107 reached the following agreement.

"Pre-emptive" BSR may be included.
R2 assumes that a new trigger rule is introduced only for the pre-emptive BSR. In other words, the SR trigger is managed by the NR Rel-15 baseline (in terms of the SR trigger, pre-emptive BSR=regular BSR).
R2 assumes that a trigger for both types of pre-emptive BSR (1. based on the UL grant provided to the slave node and/or UE, 2. based on the BSR from the slave node or UE) can be supported by an IAB Rel-16 operation. What is specified needs to be further studied.
The discussion postponed to the next meeting is continued (documents are submitted again without any change)

In the supplementary note, the details of and possible problems with the pre-emptive BSR will be described based on the above-described discussion.
Discussion
Data Amount Calculation As illustrated in FIG. 8, the pre-emptive BSR is expected to be used for buffer state reporting based on the amount of data expected to be available for the MT as well as on data that can be used for transmission by the MAC and RLC of the MT. The agreement itself only refers to the trigger condition for the pre-emptive BSR, but the above-described use of the pre-emptive BSR may be suggested by the current assumption "1. based on the UL grant provided to the slave node and/or UE, 2. based on the BSR from the slave node or UE."

Observation 1: in addition to complying with existing rules, the pre-emptive BSR is expected to report the buffer size for the MAC, RLC, and BAP of the IAB node in addition to the buffer size of the downstream IAB node/UE.

In the current specification, enabling UL data to be transmitted triggers the regular BSR as follows:

The MAC entity determines the amount of UL data available to the logical channel according to a data amount calculation procedure of TS 38.322 and 38.323.

The BSR is triggered in a case that any of the following events occurs.

UL data of a logical channel belonging to the LCG becomes available to the MAC entity; and
the UL data belongs to a logical channel having a higher priority than any other logical channel belonging to the LCG and including UL data available; or none of the logical channels belonging to the LCG includes UL data available.

In this case, BSR is referred to as the "regular BSR".

Observation 2: in accordance with a data amount calculation procedure in the RLC (and PDCP), the regular BSR is triggered when the UL data becomes available to the MAC entity.

As described below, the existing data amount calculation procedure takes into account only the operation of the UE, i.e., the operation during transmission of the UL data.

5.5 Data Amount Calculation

For MAC buffer state reporting, the UE considers the following as the amount of RLC data.

RLC SDUs and RLC SDU segments not included in the RLC data PDUs yet

RLC data PDUs for which initial transmission is pending

RLC data PDUs for which retransmission is pending (RLC AM)

Furthermore, in a case that STATUS PDUs are triggered and the t-StatusProhibit has not been performed or has expired, the UE estimates the size of the STATUS PDUs transmitted at the next transmission opportunity, and considers the size as a part of the amount of RLC data.

Observation 3: The existing data amount calculation procedure is applicable only to the RLC of the MT.

In view of the observations described above, the data amount calculation procedure should be extended to support the pre-emptive BSR. The following amounts of data should be studied.

MAC (the reception side, that is, on the DU): the buffer size reported in the (existing) BSR from the downstream node/UE, and the MAC PDUs and the MAC SDUs still remaining on the reception side of the MAC are considered as the amount of MAC data.

RLC (the reception side, that is, on the DU): the RLC PDUs and RLC SDUs still remaining on the reception side of RLC are considered as the amount of RLC data.

BAP: for example, BAP PDUs still remaining in a routing process or the like is considered as the amount of BAP data.

These additional amounts of data are finally notified to the MAC (the transmission side, that is, on the MT) and reported in the pre-emptive BSR.

Proposal 1: RAN2 should agree that the buffer size reported in the BSR from the downstream node/UE and the MAC PDUs and MAC SDUs still remaining on the reception side of the MAC are included in the MAC specification for data amount calculation.

Proposal 2: RAN2 should agree that the RLC PDUs and the RLC SDUs still remaining on the reception side of the RLC are included in the RLC specification as an RLC data amount calculation.

Proposal 3: RAN2 should agree that, for example, the BAP PDUs still remaining in the routing process are included in the BAP specification as a BAP data amount calculation.

These additional data amount calculation procedures are mainly on the DU side (of the intermediate IAB node), and thus an option is to leave the procedure to the implementation of the DU. However, in terms of the DU of the upstream IAB node/donor, the pre-emptive BSR is used for scheduling radio resources. In other words, the operation of the downstream node (in this case the intermediate node) needs to be deterministic and controllable. Accordingly, activation/deactivation of each procedure should depend on configuration made via the RRC or F1-AP.

Proposal 4: RAN2 should discuss whether additional data amount calculation procedures can be activated/deactivated through the configuration made via the RRC or F1-AP.

MAC CE Format

Another point of the mail discussion is whether to reuse existing BSR MAC CEs or to define new pre-emptive BSR MAC CEs. In other words, in terms of a scheduler for the upstream DU, whether to distinguish the "expected amount of data" from the existing buffer size has not been determined yet.

The reuse of the existing BSR MAC CEs was desired, but further analysis led to finding of potential problems. Given a scenario of the multi-hop backhaul, as illustrated in FIGS. 9 and 10, it is not clear whether the pre-emptive BSR includes buffer reports of all the downstream IAB nodes (i.e., child, grandchild, great-grandchild: option 1) or only the nearest hop (i.e., the child and the IAB node itself: option 2).

Observation 4: it is unclear whether the pre-emptive BSR includes the buffer size of all the downstream nodes on the multi-hop backhaul.

Option 1 may provide the highest performance for low latency scheduling in a case that resource allocation and UL data transmission are performed in a timely manner on the multi-hop backhaul. Otherwise, overscheduling may occur on an upstream backhaul. On the other hand, option 2 is a more secure scheme because option 2 corresponds to a type of hop-by-hop scheduling.

In a case that option 1 is a point of discussion or is configurable, a new MAC CE should be introduced to distinguish the expected amount of data from actual buffered data. In a case that the new MAC CE is not introduced, the existing MAC CE is considered to still function sufficiently.

Proposal 5: RAN2 should discuss whether to introduce the new MAC CE into the pre-emptive BSR by taking into account not only the viewpoint of the scheduler implementation, but also the details of the expected amount of data (i.e., one of the nearest downstream nodes or one of all the downstream multi-hop nodes).

Trigger Conditions

R2 agreed that "R2 assumes that a trigger for both types of pre-emptive BSR (1. based on the UL grant provided to the slave node and/or UE, 2. based on the BSR from the slave node or UE) can be supported by an IAB Rel-16 operation. What is specified needs to be further studied." Aperiodic occurrences of these triggers, that is, triggers based on events may be intended. In addition, the two identified types are based on the plural form, that is, a plurality of "UL grants" and "BSRs".

Figure 12:
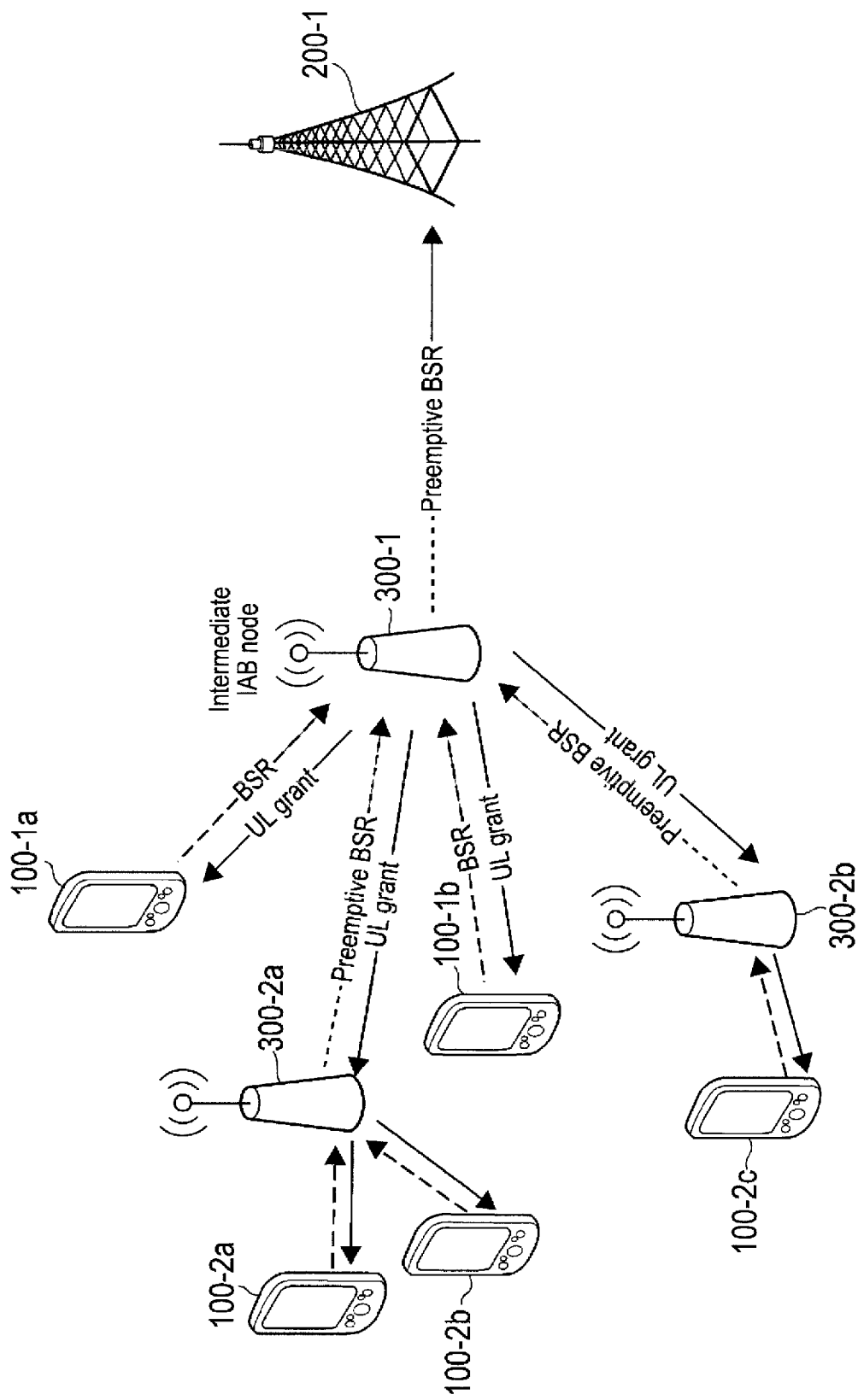
FIG. 12 is a diagram related to Supplementary Note.

As illustrated in FIG. 12, given that the intermediate IAB node handles a plurality of downstream nodes, the trigger for the pre-emptive BSR to the upstream is associated with a plurality of downstream events, i.e., BSR reception or provision of UL grant. In this case, several major problems are observed as follows:

Problem 1: in a case that the pre-emptive BSR is triggered by all downstream events, excessively may triggers are available.

Problem 2: in a case that the pre-emptive BSR waits for all downstream events, the trigger may be excessively delayed.

To avoid these problems, the trigger conditions are desirably carefully defined.

Proposal 6: RAN2 should discuss the trigger for the pre-emptive BSR in view of a plurality of downstream nodes.

The invention claimed is:

1. A communication control method executed in a relay apparatus, the relay apparatus having a base station function connecting wirelessly to a lower apparatus, and a user equipment function connecting wirelessly to an upper apparatus, the relay apparatus relaying upstream data from the lower apparatus to the upper apparatus, the communication control method comprising:
transmitting, by a MAC layer of the user equipment function, a pre-emptive buffer state report indicating an amount of untransmitted upstream data of the lower apparatus, to the upper apparatus, wherein
the pre-emptive buffer state report is transmitted together with a MAC subheader including a logical channel ID defined for the pre-emptive buffer state report, and
a format of the pre-emptive buffer state report is identical to a format of a buffer state report indicating untransmitted upstream data of the relay apparatus, wherein
the communication control method further comprises
receiving, by the base station function, a first buffer state report from the lower apparatus, the first buffer state report indicating an amount of the untransmitted upstream data of the lower apparatus;
receiving, by the base station function, a second buffer state report different from the first buffer state report from the lower apparatus, the second buffer state report indicating an amount of untransmitted upstream data of a lower apparatus of the lower apparatus, wherein
the pre-emptive buffer state report is based on the amount of the untransmitted upstream data indicated by the first buffer state report, out of the first buffer state report and the second buffer state report.

2. The communication control method according to claim 1, wherein
the user equipment function has a dual connectivity with the upper apparatus and another upper apparatus different from the upper apparatus.

3. The communication control method according to claim 1, further comprising:
notifying, by the base station function, the user equipment function, of the first buffer state report.

4. The communication control method according to claim 1, further comprising switching between enabling and disabling of the notifying on a per logical channel basis or on a per logical channel group basis.

5. The communication control method according to claim 4, wherein
the switching includes switching between enabling and disabling of notifying on a per logical channel basis or on a per logical channel group basis in accordance with configuration provided for the relay apparatus by a donor base station.

6. A relay apparatus comprising:
a base station function configured to connect wirelessly to a lower apparatus; and
a user equipment function configured to connect wirelessly to an upper apparatus, wherein
the relay apparatus is configured to relay upstream data from the lower apparatus to the upper apparatus,
the user equipment function is configured to transmit a pre-emptive buffer state report indicating an amount of untransmitted upstream data of the lower apparatus, to the upper apparatus,
the pre-emptive buffer state report is transmitted together with a MAC subheader including a logical channel ID defined for the pre-emptive buffer state report, and
a format of the pre-emptive buffer state report is identical to a format of a buffer state report indicating second untransmitted upstream data in the relay apparatus, wherein
the base station function is configured to receive a first buffer state report from the lower apparatus, the first buffer state report indicating an amount of the untransmitted upstream data of the lower apparatus;
the base station function is configured to receive a second buffer state report different from the first buffer state report from the lower apparatus, the second buffer state report indicating an amount of untransmitted upstream data of a lower apparatus of the lower apparatus, wherein
the pre-emptive buffer state report is based on the amount of the untransmitted upstream data indicated by the first buffer state report, out of the first buffer state report and the second buffer state report.

7. A chipset controlling a relay apparatus, the relay apparatus configured to connect wirelessly to a lower apparatus and an upper apparatus, the relay apparatus configured to relay upstream data from the lower apparatus to the upper apparatus, the chipset comprising a processor and a memory, the processor configured to
transmit a pre-emptive buffer state report indicating an amount of untransmitted upstream data of the lower apparatus, to the upper apparatus, wherein
the pre-emptive buffer state report is transmitted together with a MAC subheader including a logical channel ID defined for the pre-emptive buffer state report, and
a format of the pre-emptive buffer state report is identical to a format of a buffer state report indicating second untransmitted upstream data in the relay apparatus, wherein
the processor is configured to
receive a first buffer state report from the lower apparatus, the first buffer state report indicating an amount of the untransmitted upstream data of the lower apparatus, and
receive a second buffer state report different from the first buffer state report from the lower apparatus, the second buffer state report indicating an amount of untransmitted upstream data of a lower apparatus of the lower apparatus, wherein
the pre-emptive buffer state report is based on the amount of the untransmitted upstream data indicated by the first buffer state report, out of the first buffer state report and the second buffer state report.

* * * * *